(12) United States Patent
Chernyavsky et al.

(10) Patent No.: US 11,720,331 B2
(45) Date of Patent: Aug. 8, 2023

(54) KEYBOARD ACCESSIBLE WEB PAGE EMBEDDED INTERACTIVE ELEMENT

(71) Applicant: Citrix Systems, Inc., Fort Lauderdale, FL (US)

(72) Inventors: Georgiy Chernyavsky, Prague (CZ); Tomáš Navrátil, Prague (CZ)

(*) Notice: Subject to any disclaimer, the term of this patent is extended or adjusted under 35 U.S.C. 154(b) by 95 days.

(21) Appl. No.: 17/524,821

(22) Filed: Nov. 12, 2021

(65) Prior Publication Data

US 2023/0153077 A1  May 18, 2023

(51) Int. Cl.
*G06F 9/44* (2018.01)
*G06F 8/33* (2018.01)
*G06F 16/958* (2019.01)
*G06F 8/34* (2018.01)

(52) U.S. Cl.
CPC .................. *G06F 8/33* (2013.01); *G06F 8/34* (2013.01); *G06F 16/958* (2019.01)

(58) Field of Classification Search
None
See application file for complete search history.

(56) References Cited

U.S. PATENT DOCUMENTS

| | | | |
|---|---|---|---|
| 9,916,291 B2 * | 3/2018 | Shu | G06F 16/958 |
| 2009/0083028 A1 * | 3/2009 | Davtchev | G06F 40/53 704/9 |
| 2017/0308591 A1 * | 10/2017 | Mohsin | G06F 3/04842 |
| 2019/0018560 A1 * | 1/2019 | Lee | G06F 3/0484 |
| 2020/0401252 A1 * | 12/2020 | Kuan | G06F 3/0418 |
| 2021/0157428 A1 * | 5/2021 | Jordan | H03K 17/9622 |

* cited by examiner

*Primary Examiner* — Anna C Deng

(57) ABSTRACT

A disclosed computing device is configured to: in response to an actuation of a first set of keys on a keyboard, navigating to and selecting an embedded code editor on a web page, wherein the code editor transitions from an unfocused state on the web page to a focused and read-only state on the web page; in response to an actuation of a second set of keys on the keyboard, activating the code editor, wherein the code editor transitions from the focused and read-only state on the web page to a focused and editable state on the web page; and in response to an actuation of a third set of keys on the keyboard, deactivating the code editor, wherein the code editor transitions from the focused and editable state on the web page to the focused and read-only state on the web page.

18 Claims, 7 Drawing Sheets

KEYBOARD ACCESSIBLE WEB PAGE EMBEDDED INTERACTIVE ELEMENT

BACKGROUND OF THE DISCLOSURE

There exist certain web accessibility standards that describe how a web page or a web product should be designed and implemented in order to be accessible for people with disabilities. Among these standards are the Americans with Disabilities Act (ADA) and the Web Content Accessibility Guidelines (WCAG).

One factor of web accessibility is keyboard navigation, especially for people who have difficulty using a mouse or other similar input devices and who rely solely on a keyboard as a main computer input device. When a web page is keyboard accessible, a user should be able to navigate, select, and interact with all of the elements of the web page using only a keyboard.

BRIEF DESCRIPTION OF THE DISCLOSURE

Aspects of this disclosure include a computing device, method, and computer readable medium for navigating and interacting with an embedded interactive element (e.g., an embedded code editor) in a web page using only a keyboard.

A first aspect of the disclosure provides a computing device, including: a memory; and a processor coupled to the memory and configured to: in response to an actuation of a first set of keys on a keyboard, navigating to and selecting an embedded code editor on a web page, wherein the embedded code editor transitions from a first, unfocused state on the web page to a second, focused and read-only state on the web page in response to the actuation of the first set of keys on the keyboard; in response to an actuation of a second set of keys on the keyboard and after selection of the embedded code editor, activating the embedded code editor, wherein the embedded code editor transitions from the second, focused and read-only state on the web page to a third, focused and editable state on the web page in response to the actuation of the second set of keys on the keyboard; and in response to an actuation of a third set of keys on the keyboard, deactivating the embedded code editor, wherein the embedded code editor transitions from the third, focused and editable state on the web page to the second, focused and read-only state on the web page in response to the actuation of the third set of keys on the keyboard.

A second aspect of the disclosure provides a method for navigating and interacting with an embedded code editor on a web page using only a keyboard, the method including: in response to an actuation of a first set of keys on the keyboard, activating the embedded code editor on the web page, wherein the embedded code editor transitions from a focused and read-only state on the web page to a focused and editable state on the web page in response to the actuation of the first set of keys on the keyboard; and in response to an actuation of a second set of keys on the keyboard, deactivating the embedded code editor, wherein the embedded code editor transitions from the focused and editable state on the web page to the focused and read-only state on the web page in response to the actuation of the second set of keys on the keyboard.

A third aspect of the disclosure provided a device configured to navigate and interact with an embedded code editor on a web page using only a keyboard by performing actions comprising: in response to an actuation of a first set of keys on the keyboard, activating the embedded code editor on the web page, wherein the embedded code editor transitions from a focused and read-only state on the web page to a focused and editable state on the web page in response to the actuation of the first set of keys on the keyboard; and in response to an actuation of a second set of keys on the keyboard, deactivating the embedded code editor, wherein the embedded code editor transitions from the focused and editable state on the web page to the focused and read-only state on the web page in response to the actuation of the second set of keys on the keyboard.

A fourth aspect of the disclosure provides a computer readable medium having program code, which when executed by a computing device, causes the computing device to navigate and interact with an embedded code editor on a web page using only a keyboard by performing actions, including: in response to an actuation of a first set of keys on the keyboard, activating the embedded code editor on the web page, wherein the embedded code editor transitions from a focused and read-only state on the web page to a focused and editable state on the web page in response to the actuation of the first set of keys on the keyboard; and in response to an actuation of a second set of keys on the keyboard, deactivating the embedded code editor, wherein the embedded code editor transitions from the focused and editable state on the web page to the focused and read-only state on the web page in response to the actuation of the second set of keys on the keyboard.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for navigating and interacting with an embedded interactive element (e.g., an embedded code editor) in a web page using only a keyboard.

When an interactive element on a web page is able to handle (receive) keyboard input, it is said to have "focus." Only a single interactive element is able to have focus at a time. The order in which focus proceeds forward and backward through interactive elements on a web page is called the focus order (also referred to as the Tab order).

When navigating a web page with a keyboard, the Tab key is typically used to move focus to the next interactive element in the focus order on the web page, while a Shift+Tab key combination is used to move focus to the previous interactive element in the focus order. However, if an interactive element of a web page uses the Tab key for certain internal actions, such as for navigating within that interactive element, the user may not be able to use the Tab key or the Shift+Tab key combination in a normal and intuitive manner to navigate away from that interactive element to a next or previous interactive element in the focus order of the web page. To this extent, the user is effectively trapped within that interactive element and cannot escape from that interactive element using the Tab key or the Shift+Tab key combination. This situation is known as a Tab trap (also commonly referred to as a keyboard trap).

Figure 1:
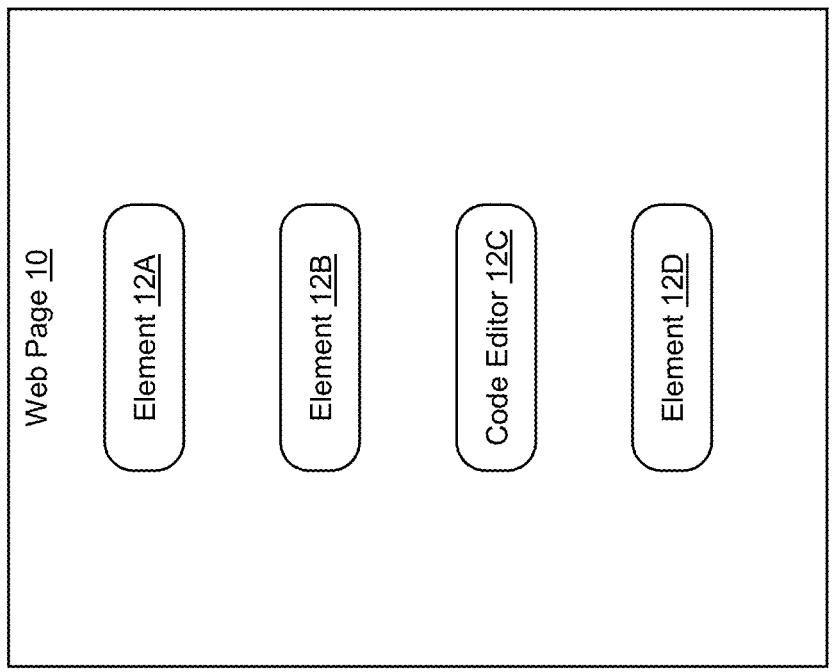
FIG. 1 depicts a web page including a plurality of interactive elements, including an embedded code editor.

FIG. 1 depicts a web page 10 including a plurality of interactive elements 12A-D (generally referred to as interactive elements 12). In general, an interactive element may include any type of element that a user interacts with on a web page, including, for example, links, input fields, drop-down menus, buttons, and/or the like, In FIG. 1, the interactive elements 12A, 12B, and 12D may include, for example, text input fields, while the interactive element 12C is a code editor (hereafter also referred to "code editor 12C") embedded in the web page 10. A code editor is a text editor program designed for editing source code of computer programs. It may be a standalone application or it may be built into an integrated development environment (IDE) or, as described herein, it may be embedded in a web page.

Figure 2:
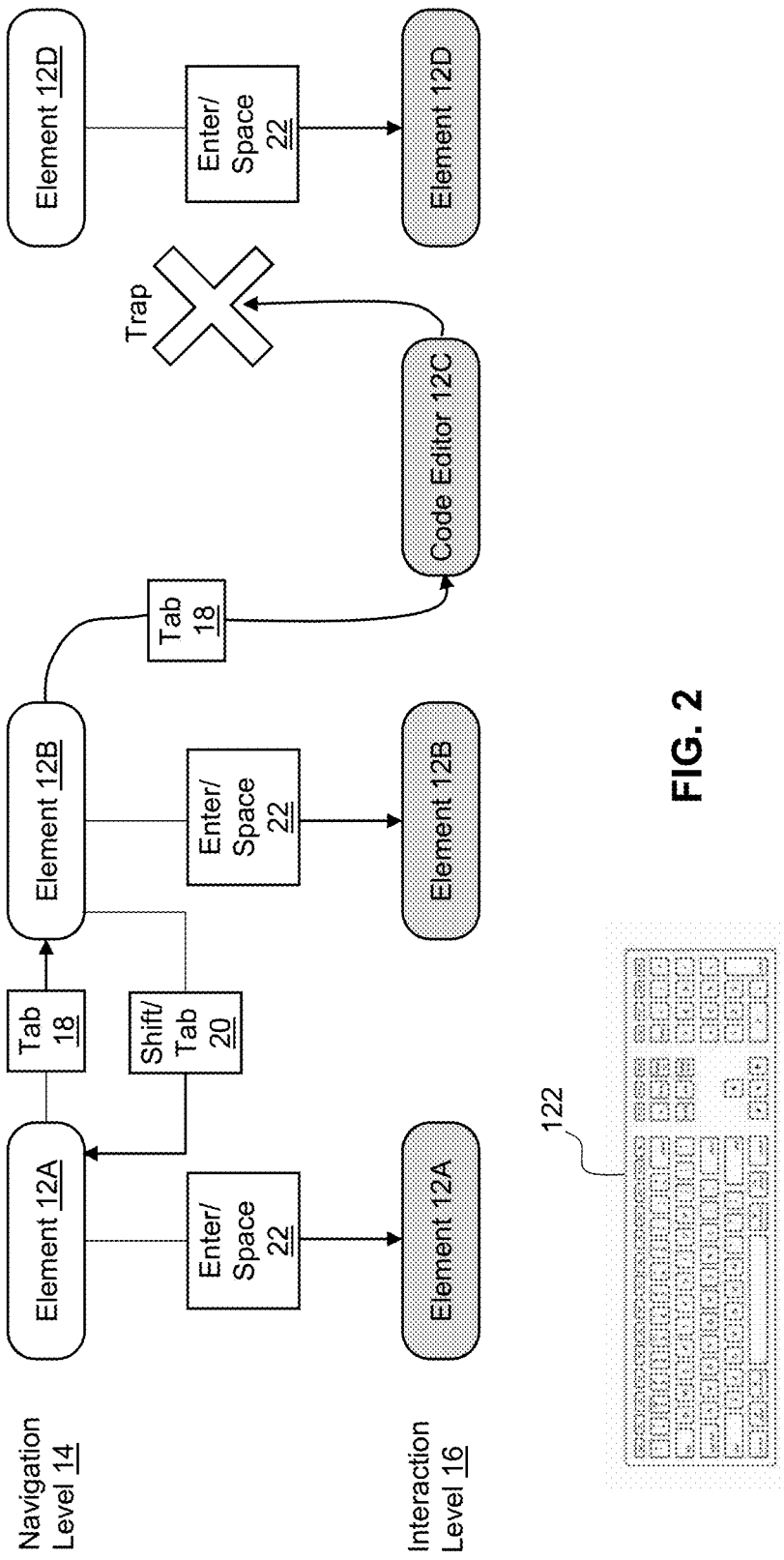
FIG. 2 depicts a process flow diagram illustrating navigation of the web page of FIG. 1 using only a keyboard.

FIG. 2 depicts a process flow diagram illustrating navigation of the web page 10 of FIG. 1 using only a keyboard. FIG. 2 includes a navigation level 14 of a user interface of a web browser, in which a user may navigate to or through the interactive elements 12 of the web page 10, and an interaction level 16 of the user interface of the web browser, in which the user may interact with the interactive elements 12 of the web page 10. In the navigation level 14, a user may, for example, press a Tab key 18 or a Shift+Tab key combination 20 on a keyboard 122 to navigate forward or backward between the interactive elements 12 in accordance with the focus order of the web page 10. The user may interact with an interactive element 12 currently in focus by pressing, for example, the Enter or Space key 22 (hereafter "Enter/Space key 22") on the keyboard 122.

After navigating from the interactive element 12B to the code editor 12C using the Tab key 18, the code editor 12C may be programmed to immediately enter an active or otherwise interactive state as soon as it becomes in focus without the user having pressed the Enter/Space key 20. In the interactive state, the Tab key 18 and Shift+Tab key combination 20 may be used by the code editor 12C to move focus to a next or previous interactive element within the code editor 12C in accordance with the focus order of the code editor 12C. To this extent, since the Tab key 18 and the Shift+Tab key combination 20 are being used to navigate internally within the code editor 12C, the Tab key 18 and the Shift+Tab key combination 20 cannot also be used to navigate out of the code editor 12C and back to the navigation level 14. The user is now effectively "trapped" in the code editor 12C and cannot navigate away from the code editor 12C to any of the interactive elements 12B or 12D of the web page 10 in a conventional manner using the Tab key 18 or a Shift+Tab key combination 20.

To address these and other issues, various disclosed implementations provide a computing device, method, and computer readable medium for navigating and interacting with an embedded interactive element (e.g., a code editor) in a web page using only a keyboard. Although described for use with an embedded code editor, the concepts described herein may be applied to other interactive elements embedded in a web page that may use the Tab key or the Shift-Tab key combination to activate a specific function. This may include, for example, an interactive spreadsheet editor or viewer, where a user can use the Tab key or the Shift-Tab key combination to move between columns. Another example may include an embedded command line window on a webpage, which uses the Tab key or the Shift-Tab key combination to cycle through last used commands.

Figure 3:
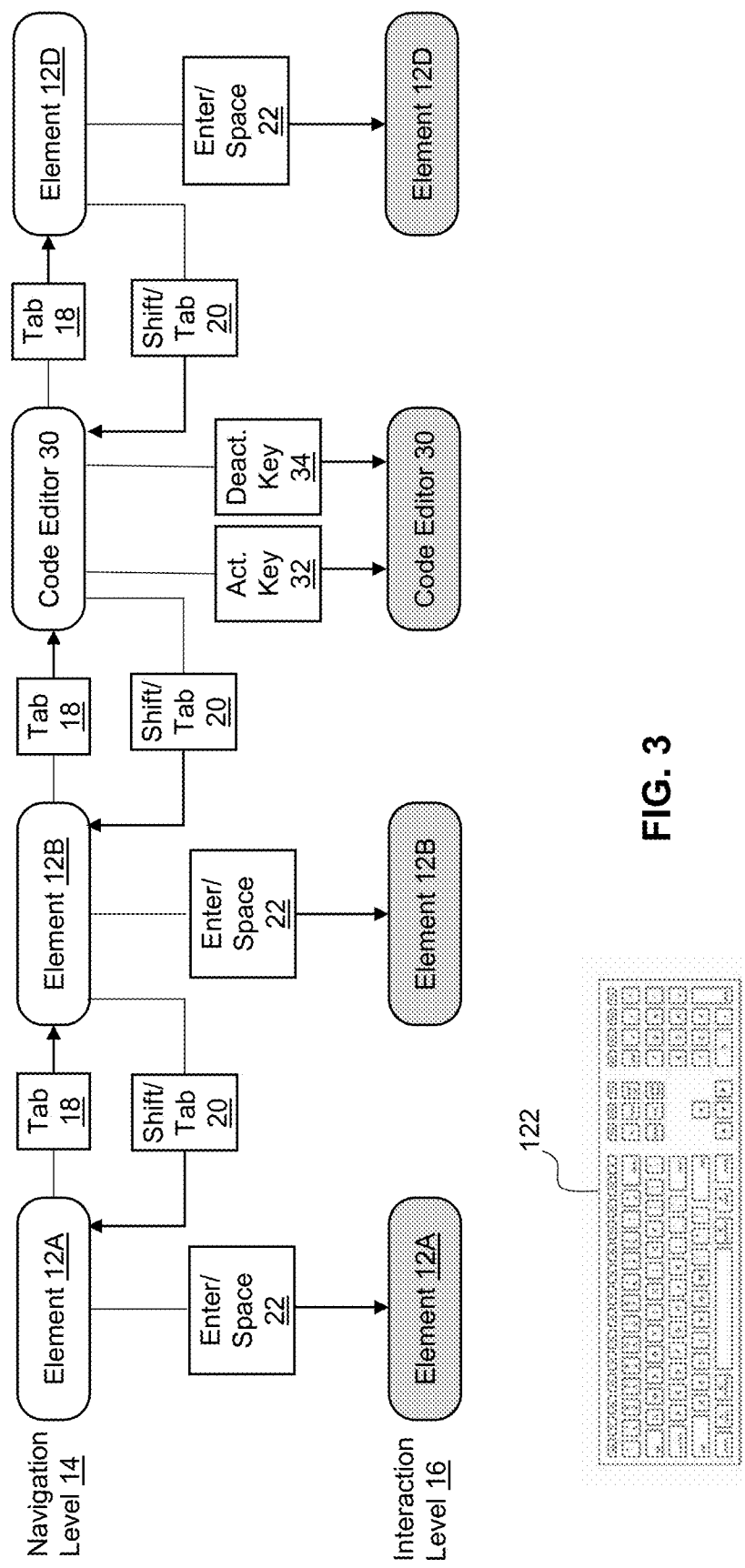
FIG. 3 depicts a process flow diagram for navigating and interacting with an embedded interactive element in a web page using only a keyboard in accordance with an illustrative embodiment.

FIG. 3 depicts a process flow diagram for navigating and interacting with a code editor 30 embedded in a web page using only a keyboard 122 in accordance with an illustrative embodiment. As shown, a user may navigate to or away from the embedded code editor 30 in a conventional manner using the Tab key 18 or the Shift+Tab key combination 20 on the keyboard 122. Unlike the code editor 12C in FIG. 2, however, the embedded code editor 30 in FIG. 3 is programmed such that it does not immediately enter an interactive (active) state as soon as it has been selected using the Tab key 18 or the Shift+Tab key combination 20. Rather, a user must first provide an input on an activation key or activation key combination 32 (hereafter collectively referred to as an "activation key 32") of the keyboard 122 to activate and interact with the selected, embedded code editor 30. To provide consistency among the interactive elements 12, the activation key 32 may include the Enter/Space key 22, although other activation keys or activation key combinations may also be used.

After the embedded code editor 30 has been activated, the user may write and edit the contents of the embedded code editor 30 using the keyboard 122 and may use the Tab key 18 and Shift+Tab key combination 20 on the keyboard 122 to move focus to a next or previous tab stop within the embedded code editor 30. Thereafter, the user may deactivate the embedded code editor 30 and return to the navigation level 14 by pressing a deactivation key or deactivation key combination 34 (hereafter referred to collectively as a "deactivation key 34") on the keyboard 122. For example, the deactivation key 34 may include the Escape key. Again, other deactivation keys or deactivation key combinations may be used. Upon deactivation, the embedded code editor 30 remains selected and in focus, but is in a read-only state.

Figure 4:
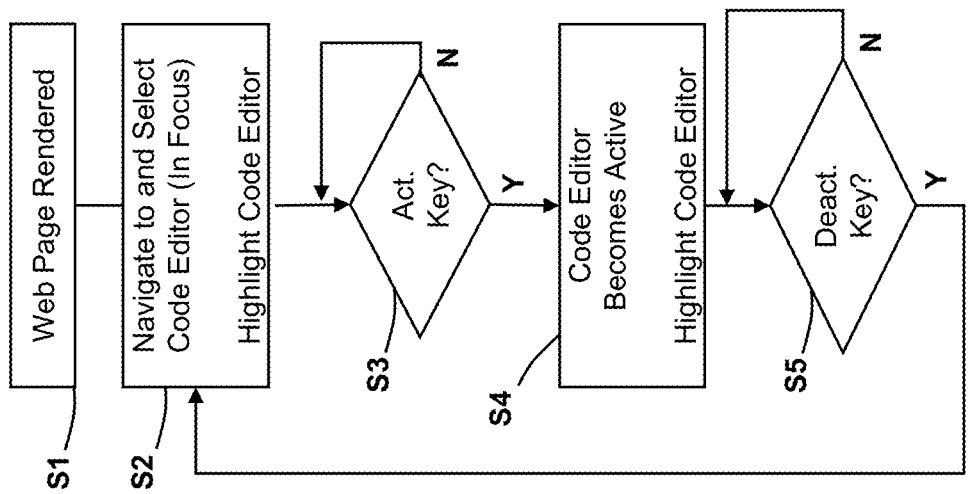
FIG. 4 depicts a flowchart of a process for navigating and interacting with an embedded interactive element in a web page using only a keyboard in accordance with an illustrative embodiment.

FIG. 4, described with reference to FIG. 3, depicts a flowchart of a process for navigating and interacting with an embedded code editor 30 in a web page using only a keyboard in accordance with an illustrative embodiment.

At process S1, a web page is rendered and the embedded code editor 30 is not in focus and is not readable. To this extent, when not in focus, the embedded code editor 30 is not able to receive input from a keyboard 122. At process S2, a user navigates to and selects the embedded code editor 30

(e.g. using the Tab key 18). At this point, the embedded code editor 30 is selected and in focus, but not activated. To indicate that the embedded code editor 30 is selected and in focus, the embedded code editor 30 may be visually highlighted in some manner (e.g., using a different border style). The embedded code editor 30 will remain selected and in focus until the user navigates to the next or previous interactive element 12 using the Tab key 18 and/or Shift-Tab key combination 22.

At process S3, if the activation key 32 has been pressed (Y at process S3), flow passes to process S4. If the activation key 32 has not been pressed (N at process S3), the embedded code editor 30 remains selected and in focus.

At process S4, after the activation key 32 has been pressed, the embedded code editor 30 transitions from the navigation level 14 to the interaction level 16 and becomes active. After the embedded code editor 30 has been activated using the activation key 32, the user may write and edit the contents of the embedded code editor 30 and may use the Tab key 18 and Shift+Tab key combination 20 on the keyboard 122 to move the current active input indicator to a next or previous tab stop within the embedded code editor 30.

If the deactivation key 32 is pressed while the embedded code editor 30 is active (Y at process S5), flow passes back to S2. This returns the embedded code editor 30 from the interaction level 16 to the navigation level 14, where the embedded code editor 30 remains selected, in focus, but not activated. The embedded code editor 30 remains active until the deactivation key 32 is pressed (N at process S5).

Figure 5:
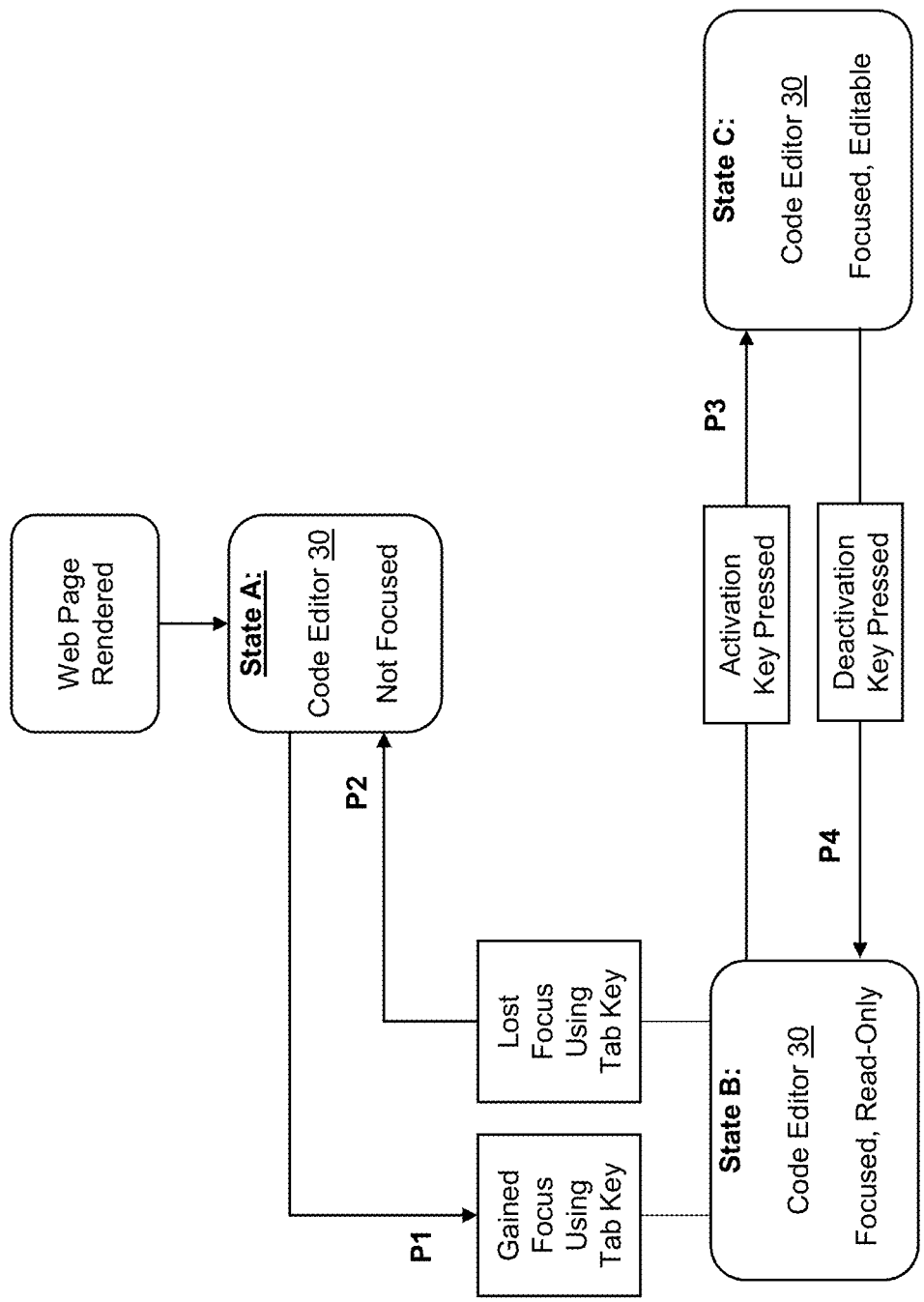
FIG. 5 is state diagram for an embedded interactive element in a web page in accordance with an illustrative embodiment, where a keyboard is used to navigate to and interact with the embedded interactive element.

FIG. 5, described with reference to FIG. 3, is a state diagram for an embedded code editor 30 in a web page in accordance with an illustrative embodiment, where a keyboard 122 (FIG. 3) is used to navigate to and interact with the embedded code editor 30.

As shown in FIG. 5, the embedded code editor 30 has three states:
State A: code editor 30 not focused (not selected);
State B: code editor 30 focused, read-only (selected, not activated); and
State C: code editor 30 focused, editable (selected, activated).

In State A, the embedded code editor 30 rendered on the web page has not been selected by the user and is not in focus. When not in focus, the embedded code editor 30 is not able to receive input from a keyboard 122. While in State A, the user may navigate the web page and select the embedded code editor 30 or other interactive elements 12 (FIG. 3) of the web page using the Tab key 18 or the Shift-Tab key combination 22 on the keyboard. Once selected, the embedded code editor 30 transitions along path P1 from State A to State B.

In State B, the embedded code editor 30 has been selected, is now in focus, but has not yet been activated (read-only). To this extent, the user may read but not edit the contents of the embedded code editor 30. The selection of the embedded code editor 30 may be indicated, for example, by visually highlighting the embedded code editor 30 on the web page in some manner (e.g., using a different border style) or via an announcement made by screen reading software.

The embedded code editor 30 remains in State B until one of the following occurs:
A) The user navigates to a different interactive element 12 on the web page using the Tab key 18 or the Shift-Tab key combination 22 (in this case the embedded code editor 30 transitions along path P2 from State B to State A); or B) The user presses the activation key 32 to interact with the embedded code editor 30 (in this case the embedded code editor 30 transitions along path P3 from State B to State C).

If the user navigates away from the embedded code editor 30 using the Tab key 18 or the Shift+Tab key combination 20 (State B to State A, path P2), the embedded code editor 30 is deselected and loses focus. If the user presses the activation key 32 to interact with the selected, embedded code editor 30 (State B to State C, path P3), the embedded code editor 30 is activated, remains in focus, and the user is allowed to make changes to the contents of (e.g., within) the embedded code editor 30. The activation of the embedded code editor 30 may again be indicated, for example, by visually highlighting the embedded code editor 30 on the web page in some manner or via an announcement made by screen reading software. Different highlighting may be used to differentiate the selection of the embedded code editor 30 from the activation of the embedded code editor 30.

The embedded code editor 30 remains in State C until the user presses the deactivation key 34. In response, the embedded code editor 30 transitions along path P4 from State C to State B. Although the embedded code editor 30 remains selected and in focus in State B, the user can no longer edit the contents of the embedded code editor 30, which are read-only in State B. As described above, the embedded code editor 30 will remain in State B until the user navigates to a different interactive element 12 on the web page (path P2 from State B to State A) or the user presses the activation key 32 to interact with the embedded code editor 30 (path P3 from State B to State C).

The processes described herein for navigating and interacting with an embedded interactive element in a web page in accordance with an illustrative embodiment may be extended to include the use of both a keyboard and a mouse. For example, FIG. 6 is state diagram for an embedded code editor 30 in a web page in accordance with an illustrative embodiment, where a keyboard 122 (FIG. 3) and a mouse 124 (FIG. 7) are used to navigate to and interact with an embedded code editor 30.

Figure 6:
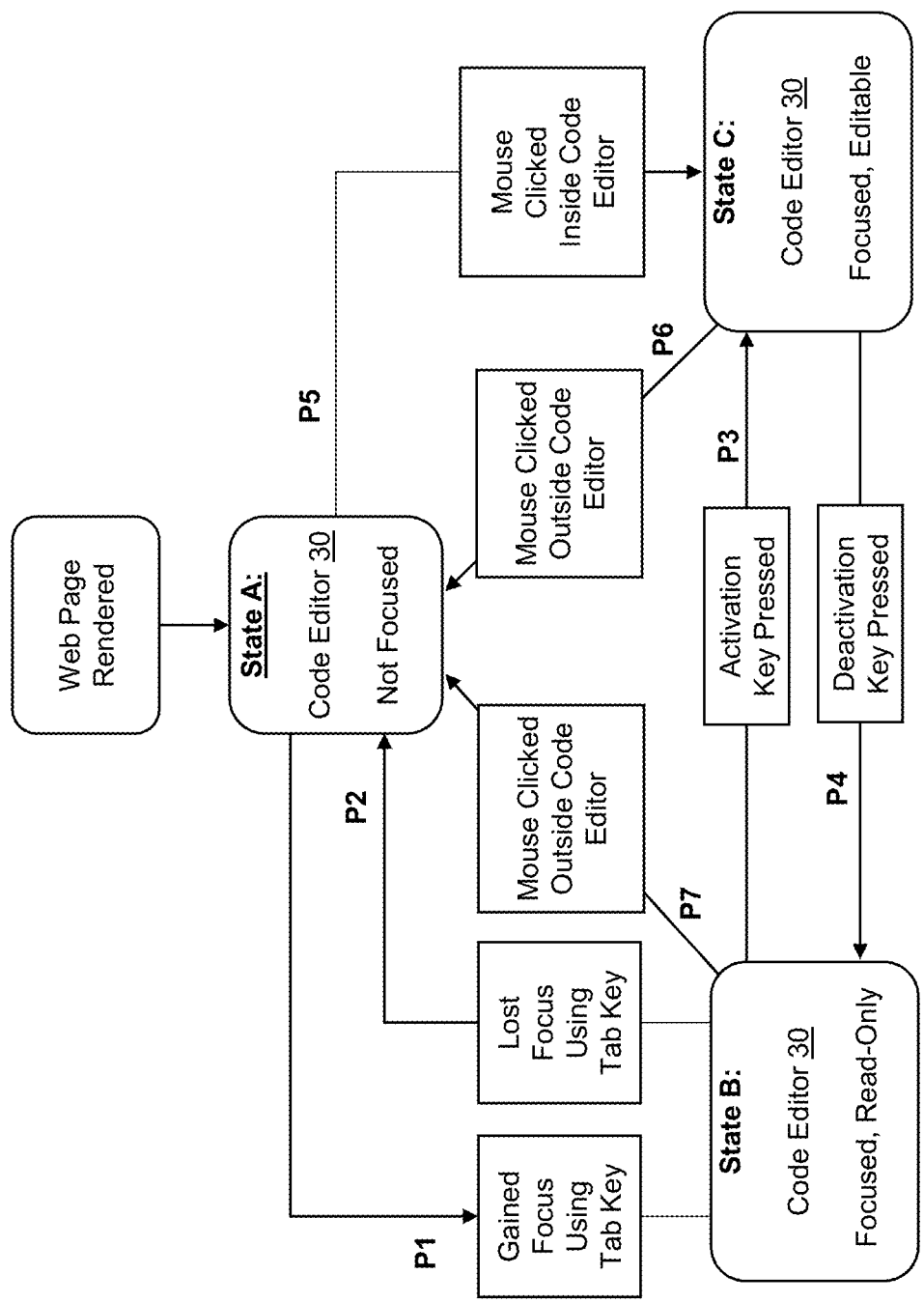
FIG. 6 is state diagram for an embedded interactive element in a web page in accordance with an illustrative embodiment, where a keyboard and a mouse are used to navigate to and interact with the embedded interactive element.

In FIG. 6, the embedded code editor 30 again has three states:
State A: code editor 30 not focused (not selected);
State B: code editor 30 focused, read-only (selected, not activated); and
State C: code editor 30 focused, editable (selected, activated). As described above with regard to FIG. 5, a keyboard 122 can be used to transition between State A, State B, and State C along paths P1, P2, P3, and P4.

In FIG. 6, instead of using the keyboard 122 to transition from State A to State B to State C, a user may click the mouse 124 on the embedded code editor 30 in the web page to transition directly from State A directly to State C along path P5. As a result, the embedded code editor 30 is simultaneously selected and activated. To transition from State C back to State A along path P5, the user may click the mouse 124 outside of the embedded code editor 30 in the web page. This simultaneously deselects and deactivates the embedded code editor 30. Similarly, to transition from State B back to State A along path P7, the user may click the mouse 124 outside of the embedded code editor 30 in the web page. This deselects the embedded code editor 30.

Aspects of the disclosure allow an interactive element (e.g., a code editor), embedded in a web page, to be fully keyboard accessible (e.g., compliant with accessibility standards). The novel use of keyboard controls, such as Tab, Shift-Tab, Enter/Space, and Escape, to both navigate a web page and to select, activate, and interact with an embedded interactive element on the web page as disclosed herein, prevents Tab traps and allows a user to easily navigate a web page using only a keyboard in an intuitive, consistent, and user-friendly manner.

Figure 7:
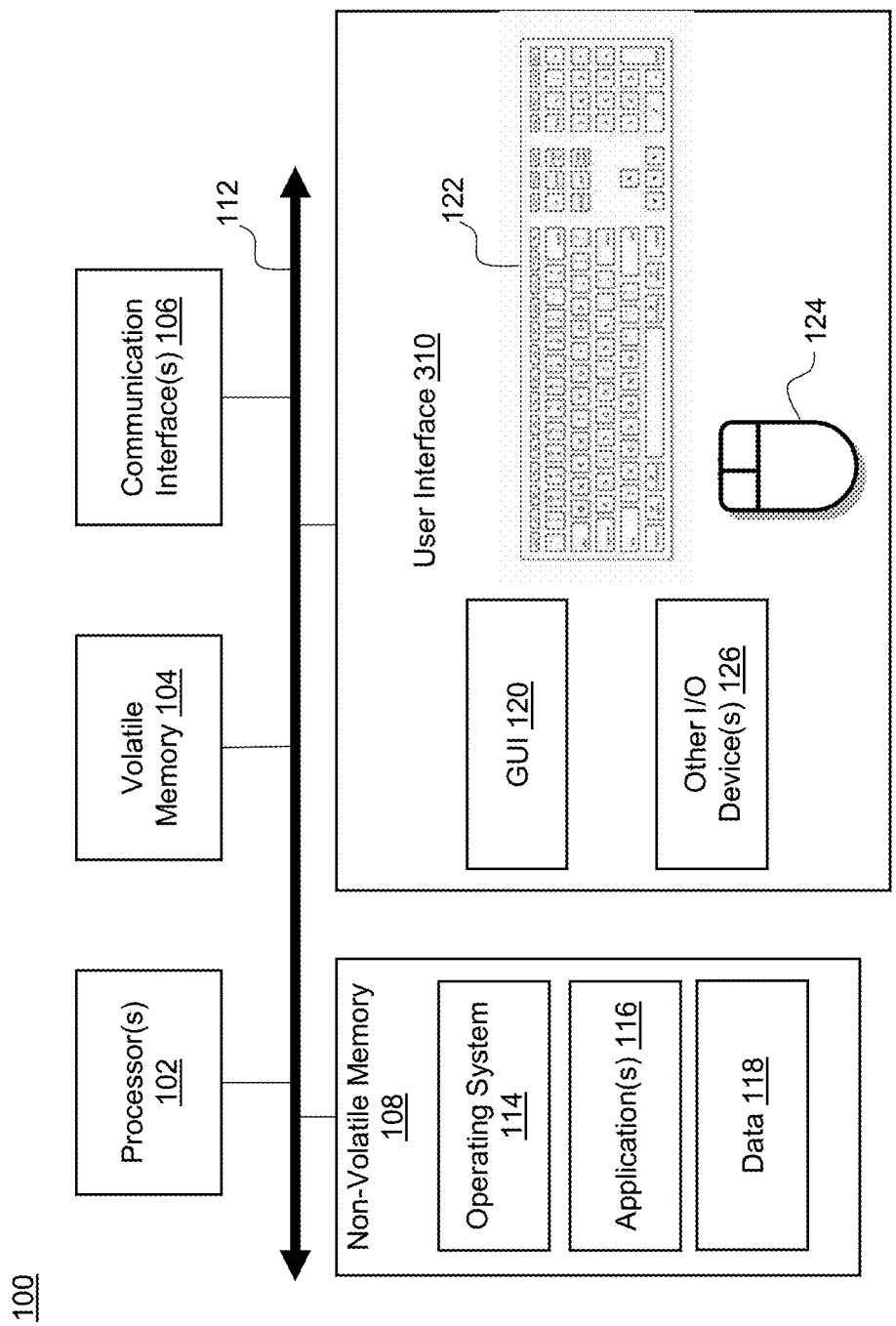
FIG. 7 depicts a computing system, in accordance with an illustrative embodiment.

Elements of the described solution may be embodied in a computing system, such as that shown in FIG. 7 in which a computing device 100 may include one or more processors 102, volatile memory 104 (e.g., RAM), non-volatile memory 108 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 110, one or more communications interfaces 106, and communication bus 112. User interface 110 may include graphical user interface (GUI) 120 (e.g., a touchscreen, a display, etc.), a keyboard 122, a mouse 124, and other input/output (I/O) devices 126. Non-volatile memory 108 stores operating system 114, one or more applications 116, and data 118 such that, for example, computer instructions of operating system 114 and/or applications 116 are executed by processor(s) 102 out of volatile memory 104. Data may be entered using an input device of GUI 120 or received from I/O device(s) 122. Various elements of computer 100 may communicate via communication bus 112. Computer 100 as shown in FIG. 9 is shown merely as an example, as clients, servers and/or appliances and may be implemented by any computing or processing environment and with any type of machine or set of machines that may have suitable hardware and/or software capable of operating as described herein.

Processor(s) 102 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 106 may include one or more interfaces to enable computer 100 to access a computer network such as a LAN, a WAN, or the Internet through a variety of wired and/or wireless or cellular connections.

In described embodiments, a first computing device 100 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The invention claimed is:

1. A computing device, comprising:
   a memory; and
   a processor coupled to the memory and configured to:
   in response to an actuation of a first set of keys on a keyboard, navigating to and selecting an embedded code editor on a web page, wherein the embedded code editor transitions from a first, unfocused state on the web page to a second, focused and read-only state on the web page in response to the actuation of the first set of keys on the keyboard;
   in response to an actuation of a second set of keys on the keyboard and after selection of the embedded code editor, activating the embedded code editor, wherein the embedded code editor transitions from the second, focused and read-only state on the web page to a third, focused and editable state on the web page in response to the actuation of the second set of keys on the keyboard; and
   in response to an actuation of a third set of keys on the keyboard, deactivating the embedded code editor, wherein the embedded code editor transitions from the third, focused and editable state on the web page to the second, focused and read-only state on the web page in response to the actuation of the third set of keys on the keyboard.

2. A method comprising:
   in response to an actuation of a first set of keys on the keyboard, activating the embedded code editor on the web page, wherein the embedded code editor transitions from a focused and read-only state on the web page to a focused and editable state on the web page in response to the actuation of the first set of keys on the keyboard;
   in response to an actuation of a second set of keys on the keyboard, deactivating the embedded code editor, wherein the embedded code editor transitions from the focused and editable state on the web page to the focused and read-only state on the web page in response to the actuation of the second set of keys on the keyboard; and
   in response to an actuation of a third set of keys on the keyboard when the embedded code editor is in the focused and read-only state, navigating away from and deselecting the embedded code editor on the web page, wherein the embedded code editor transitions from the focused and read-only state on the web page to an unfocused state on the web page in response to the actuation of the third set of keys on the keyboard.

3. The method of claim 2, wherein the third set of keys includes a Tab key or a Shift-Tab key combination.

4. The method of claim 2, further comprising navigating within the embedded code editor using a fourth set of keys on the keyboard when the embedded code editor is in the focused and editable state on the web page.

5. The method of claim 4, wherein the fourth set of keys on the keyboard includes a Tab key or a Shift-Tab key combination.

6. The method of claim 2, wherein the first set of keys on the keyboard includes an Enter key or a Space key.

7. The method of claim 6, wherein the second set of keys on the keyboard includes an Escape key.

8. The method of claim 2, wherein the embedded code editor does not transition directly between the unfocused state on the web page and the focused and editable state on the web page.

9. The method of claim 2, wherein, in the unfocused state on the web page, the embedded code editor is not selected and is not able to receive input from the keyboard.

10. The method of claim 2, wherein, in the focused and read-only state on the web page, the embedded code editor is selected and readable, but not able to receive input from the keyboard.

11. The method of claim 2, wherein in the focused and editable state on the web page, the embedded code editor is selected, activated and can receive input from the keyboard.

12. The method of claim 2, wherein in the focused and editable state on the web page, contents of the embedded code editor may be edited.

13. The method of claim 2, wherein:
   in the unfocused state on the web page, the embedded code editor is not selected and is not able to receive input from the keyboard;
   in the focused and read-only state on the web page, the embedded code editor is selected and readable, but not able to receive input from the keyboard; and
   in the focused and editable state on the web page, the embedded code editor is selected, activated and can receive input from the keyboard.

14. The method of claim 2, further comprising applying a first type of visual highlighting to the embedded code editor when the embedded code editor is in the focused and read-only state and applying a second, different type of visual highlighting to the embedded code editor when the embedded code editor is in the focused and editable state.

15. A device configured to navigate and interact with an embedded code editor on a web page using only a keyboard by performing actions comprising:
   in response to an actuation of a first set of keys on the keyboard, activating the embedded code editor on the web page, wherein the embedded code editor transitions from a focused and read-only state on the web page to a focused and editable state on the web page in response to the actuation of the first set of keys on the keyboard; and
   in response to an actuation of a second set of keys on the keyboard, deactivating the embedded code editor, wherein the embedded code editor transitions from the focused and editable state on the web page to the focused and read-only state on the web page in response to the actuation of the second set of keys on the keyboard; and
   in response to an actuation of a third set of keys on the keyboard when the embedded code editor is selected, but not activated, navigating away from and deselecting the embedded code editor on the web page, wherein the embedded code editor loses focus when deselected.

16. The device of claim 15, wherein the actions further comprise navigating within the embedded code editor, when activated, in response to an actuation of a fourth set of keys on the keyboard.

17. The device of claim 16, wherein:
the first set of keys on the keyboard includes an Enter key or a Space key; the second set of keys on the keyboard includes an Escape key;
the third set of keys on the keyboard includes a Tab key or a Shift-Tab key combination; and
the fourth set of keys on the keyboard include the Tab key or the Shift-Tab key combination.

18. The device of claim 15, wherein:
in the unfocused state on the web page, the embedded code editor is not selected and is not able to receive input from the keyboard;
in the focused and read-only state on the web page, the embedded code editor is selected and readable, but not able to receive input from the keyboard; and
in the focused and editable state on the web page, the embedded code editor is selected, activated and can receive input from the keyboard.

\* \* \* \* \*